US009667679B2

(12) United States Patent
Lang

(10) Patent No.: US 9,667,679 B2
(45) Date of Patent: May 30, 2017

(54) INDICATING AN ASSOCIATION BETWEEN A SOCIAL-MEDIA ACCOUNT AND A MEDIA PLAYBACK SYSTEM

(71) Applicant: Sonos, Inc., Santa Barbara, CA (US)

(72) Inventor: Jonathan Paul Lang, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 184 days.

(21) Appl. No.: 14/495,706

(22) Filed: Sep. 24, 2014

(65) Prior Publication Data

US 2016/0088037 A1    Mar. 24, 2016

(51) Int. Cl.
*H04L 29/08* (2006.01)
*H04L 29/06* (2006.01)
*G06Q 50/00* (2012.01)

(52) U.S. Cl.
CPC ........ *H04L 65/4069* (2013.01); *G06Q 50/01* (2013.01); *H04L 67/10* (2013.01); *H04L 67/306* (2013.01)

(58) Field of Classification Search
CPC ... H04L 65/4069; H04L 67/10; H04L 67/306; G06Q 50/01
See application file for complete search history.

(56) References Cited

U.S. PATENT DOCUMENTS

| | | | |
|---|---|---|---|
| 5,923,902 A | 7/1999 | Inagaki | |
| 6,108,686 A | 8/2000 | Williams, Jr. | |
| 6,256,554 B1 | 7/2001 | DiLorenzo | |
| 6,349,339 B1 | 2/2002 | Williams | |
| 6,404,811 B1 | 6/2002 | Cvetko et al. | |
| 6,522,886 B1 | 2/2003 | Youngs et al. | |

(Continued)

FOREIGN PATENT DOCUMENTS

| | | |
|---|---|---|
| KR | 100890993 | 3/2009 |
| WO | 0153994 | 7/2001 |

(Continued)

OTHER PUBLICATIONS

International Searching Authority, International Search Report and Written Opinion mailed on Dec. 21, 2015, issued in connection with International Application No. PCT/US2015/051983 filed on Sep. 24, 2015, 11 pages.

(Continued)

*Primary Examiner* — Dustin Nguyen
*Assistant Examiner* — Juan C Turriate Gastulo
(74) *Attorney, Agent, or Firm* — McDonnell Boehnen Hulbert & Berghoff LLP

(57) ABSTRACT

Examples disclosed herein include a social-media computing system receiving, from a first computing device, a first message indicating that a media playback system is associated with a first social-media account; and based on the received first message, sending, to a second computing device associated with a second social-media account, a second message indicating that the media playback system is associated with the first social-media account. The examples may also include the second computing device receiving, from the social-media computing system, the second message; and based on the received second message, causing display of an indication of the association between the media playback system and the second social-media account.

20 Claims, 7 Drawing Sheets

(56) References Cited

U.S. PATENT DOCUMENTS

| | | |
|---|---|---|
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 6,826,283 B1 | 11/2004 | Wheeler et al. |
| 6,985,694 B1 | 1/2006 | De Bonet et al. |
| 7,124,125 B2 | 10/2006 | Cook et al. |
| 7,130,608 B2 | 10/2006 | Hollstrom et al. |
| 7,130,616 B2 | 10/2006 | Janik |
| 7,143,939 B2 | 12/2006 | Henzerling |
| 7,236,739 B2 | 6/2007 | Chang |
| 7,236,773 B2 | 6/2007 | Thomas |
| 7,483,538 B2 | 1/2009 | McCarty et al. |
| 7,496,623 B2 | 2/2009 | Szeto et al. |
| 7,496,633 B2 | 2/2009 | Szeto et al. |
| 7,571,014 B1 | 8/2009 | Lambourne et al. |
| 7,599,685 B2 | 10/2009 | Goldberg et al. |
| 7,643,894 B2 | 1/2010 | Braithwaite et al. |
| 7,657,224 B2 | 2/2010 | Goldberg et al. |
| 7,657,910 B1 | 2/2010 | McAulay et al. |
| 7,725,533 B2 | 5/2010 | Szeto et al. |
| 7,725,551 B2 | 5/2010 | Szeto et al. |
| 7,739,271 B2 | 6/2010 | Cook et al. |
| 7,742,740 B2 | 6/2010 | Goldberg et al. |
| 7,835,689 B2 | 11/2010 | Goldberg et al. |
| 7,853,341 B2 | 12/2010 | McCarty et al. |
| 7,865,137 B2 | 1/2011 | Goldberg et al. |
| 7,916,877 B2 | 3/2011 | Goldberg et al. |
| 7,917,082 B2 | 3/2011 | Goldberg et al. |
| 8,014,423 B2 | 9/2011 | Thaler et al. |
| 8,023,663 B2 | 9/2011 | Goldberg |
| 8,028,038 B2 | 9/2011 | Weel |
| 8,028,323 B2 | 9/2011 | Weel |
| 8,045,952 B2 | 10/2011 | Qureshey et al. |
| 8,050,652 B2 | 11/2011 | Qureshey et al. |
| 8,103,009 B2 | 1/2012 | McCarty et al. |
| 8,214,873 B2 | 7/2012 | Weel |
| 8,230,099 B2 | 7/2012 | Weel |
| 8,234,395 B2 | 7/2012 | Millington |
| 8,892,648 B1 * | 11/2014 | Durham ............... G06Q 50/01 709/204 |
| 8,990,701 B2 | 3/2015 | Olofsson |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0056117 A1 | 5/2002 | Hasegawa et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2004/0088328 A1 | 5/2004 | Cook et al. |
| 2006/0253436 A1 | 11/2006 | Cook et al. |
| 2007/0043847 A1 * | 2/2007 | Carter ............... H04L 29/06027 709/223 |
| 2007/0088747 A1 | 4/2007 | Cheng et al. |
| 2007/0142944 A1 | 6/2007 | Goldberg et al. |
| 2007/0294131 A1 | 12/2007 | Roman et al. |
| 2008/0052371 A1 | 2/2008 | Partovi et al. |
| 2009/0307062 A1 | 12/2009 | Lutnick et al. |
| 2010/0017366 A1 | 1/2010 | Robertson et al. |
| 2010/0205222 A1 | 8/2010 | Gajdos et al. |
| 2010/0262909 A1 | 10/2010 | Hsieh |
| 2012/0071996 A1 | 3/2012 | Svendsen |
| 2013/0031162 A1 | 1/2013 | Willis et al. |
| 2013/0061296 A1 * | 3/2013 | Reddy ............... H04L 51/02 726/5 |
| 2013/0073584 A1 | 3/2013 | Kuper et al. |
| 2013/0173034 A1 | 7/2013 | Reimann et al. |
| 2013/0198633 A1 | 8/2013 | Hyman |
| 2013/0346859 A1 | 12/2013 | Bates et al. |
| 2014/0096219 A1 | 4/2014 | Lang et al. |
| 2014/0122590 A1 | 5/2014 | Svendsen |
| 2014/0204076 A1 | 7/2014 | Kuper et al. |
| 2014/0244863 A1 | 8/2014 | Bradley et al. |

FOREIGN PATENT DOCUMENTS

| | | |
|---|---|---|
| WO | 2012056326 A2 | 5/2012 |
| WO | 2013139239 A1 | 9/2013 |
| WO | 2014116693 A1 | 7/2014 |

OTHER PUBLICATIONS

"AudioTron Quick Start Guide, Version 1.0", Voyetra Turtle Beach, Inc., Mar. 2001, 24 pages.

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

"Bluetooth. "Specification of the Bluetooth System: The ad hoc SCATTERNET for affordable and highly functional wireless connectivity" Core, Version 1.0 A, Jul. 26, 1999, 1068 pages ".

"Bluetooth. "Specification of the Bluetooth System: Wireless connections made easy" Core, Version 1.0 B, Dec. 1, 1999, 1076 pages".

Buskirk; Eliot Van., "Music Needs 'Connective Tissue' and Facebook Wants to Build it", Evolver-1m, http://evolver. fm/2011/09/01/music-needs-connective-tissue-and-facebook-wants-to-build-iti, Sep. 1, 2011, 6 pages.

Co-pending U.S. Appl. No. 14/042,160, filed Sep. 30, 2013.
Co-pending U.S. Appl. No. 14/263,729, filed Apr. 28, 2014.
Co-pending U.S. Appl. No. 14/263,743, filed Apr. 28, 2014.
Co-pending U.S. Appl. No. 14/263,750, filed Apr. 28, 2014.
Co-pending U.S. Appl. No. 14/263,777, filed Apr. 28, 2014.

"Dell, Inc. "Dell Digital Audio Receiver: Reference Guide" Jun. 2000, 70 pages".

"Dell, Inc. "Start Here" Jun. 2000, 2 pages".

"International Preliminary Report on Patentability and Written Opinion, issued by the International Searching Authority in connection with International patent application No. PCT/US2012/056467 mailed on Apr. 3, 2014, 11 pages".

"International Search Report for Application No. PCT/US2012/056467, mailed on Feb. 28, 2013".

Jo J., et al., "Synchronized One-to-many Media Streaming with Adaptive Playout Control," Proceedings of SPIE, 2002, vol. 4861, pp. 71-82.

"Jones, Stephen. "Dell Digital Audio Receiver: Digital upgrade for your analog stereo" Analog Stereo. Jun. 24, 2000 <http://www.reviewsonline.com/articles/961906864.htm> retrieved Jun. 18, 2014, 2 pages".

"Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages".

"Palm, Inc. "Handbook for the Palm VII Handheld" May 2000, 311 pages ".

"UPnP; "Universal Plug and Play Device Architecture"; Jun. 8, 2000; version 1.0; Microsoft Corporation; pp. 1-54".

"WinHec 2000 slide deck, "Building an Audio Appliance" 138 pages".

European Patent Office, Office Action mailed on Mar. 13, 2017, issued in connection with European Application No. 15781200.9, 5 pages.

International Searching Authority, International Preliminary Report on Patentability mailed on Apr. 6, 2017, issued in connection with International Application No. PCT/US2015/051983 filed on Sep. 24, 2015, 7 pages.

* cited by examiner

INDICATING AN ASSOCIATION BETWEEN A SOCIAL-MEDIA ACCOUNT AND A MEDIA PLAYBACK SYSTEM

CROSS REFERENCE TO RELATED APPLICATIONS

This application is related to the following applications filed on the same day as the present application, the contents of each are incorporated by reference herein: "Social Media Queue", U.S. application Ser. No. 14/495,595 filed Sep. 24, 2014, "Playback Updates," U.S. application Ser. No. 14/495,633 filed Sep. 24, 2014; entitled "Associating a Captured Image with a Media Item," U.S. application Ser. No. 14/495,590 filed Sep. 24, 2014; "Media Item Context from Social Media," U.S. application Ser. No. 14/495,659 filed Sep. 24, 2014; and "Social Media Connection Recommendations Based On Playback Information," U.S. application Ser. No. 14/495,684 filed Sep. 24, 2014.

FIELD OF THE DISCLOSURE

The disclosure is related to consumer goods and, more particularly, to methods, systems, products, features, services, and other items directed to media playback or some aspect thereof.

BACKGROUND

Options for accessing and listening to digital audio in an out-loud setting were severely limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from virtually unlimited sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
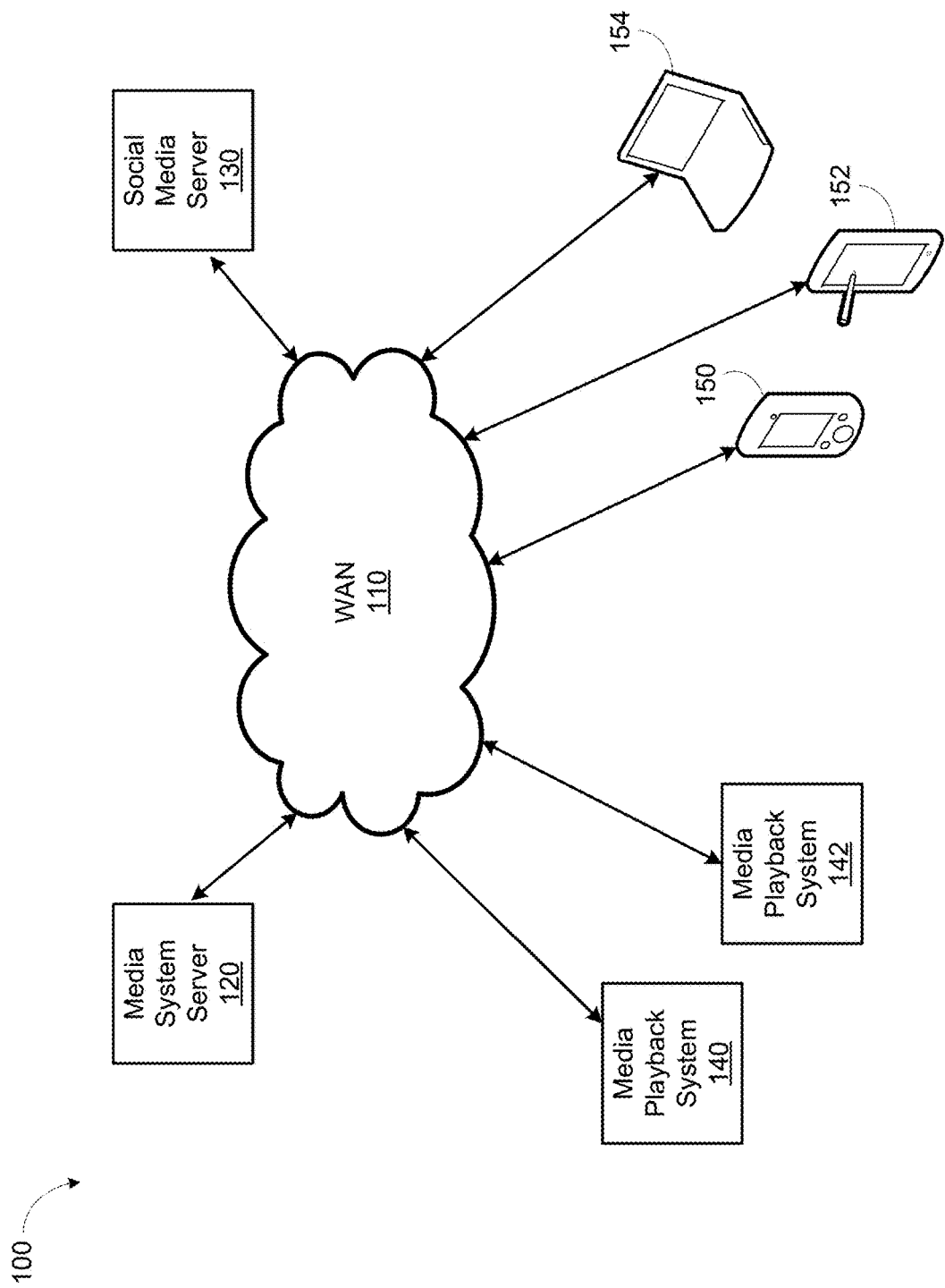
FIG. 1 shows an example network configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

In some examples, it may be useful for certain playback operations of a media playback system associated with a first social-media account to be provided to a computing device associated with a second social-media account, in order to create an interactive and/or shared media experience. For example, a first user may sign in to their social-media account and be able to learn about media content that a second user is accessing (and perhaps see a playback zone where the second user is listening to the media content), provide comments to the second user (and/or other users) regarding the media content, suggest other media content for the second user to experience, and/or access the media content himself/herself.

For instance, a first computing device may be communicatively coupled to and/or configured to control the media playback system. In some instances, the media playback system (or a media system server) may authenticate the first computing device by receiving, from the first computing device, credentials corresponding to the media playback system (or corresponding to a playback system account that corresponds to the media playback system). The first computing device may also be authenticated by a social-media server (e.g., a social-media server that manages or is otherwise associated with the first and second social-media accounts) by receiving, from the first computing device, credentials corresponding to the first social-media account. Additionally, the first computing device may detect one or more inputs representing a command to associate the media playback system (or the playback system account) with the first social-media account. This may cause the first computing device to send to the social-media server (i) data indicating the association between the first social-media account and the media playback system (or playback system account), and/or (ii) data related to playback operations of the media playback system.

The social-media server may then provide the data related to the playback operations and/or indicating the association to other computing devices that have also been authenticated by the social-media server. For example, a second computing device may be authenticated with the social-media server using credentials corresponding to the second social-media account and may receive the data from the social-media server. In one example, if the social-media server has received, from a computing device associated with the first social-media account, an authorization for the data to be shared publically, the data may be made available to any or all computing devices associated with any social-media account of the social-media server (including the second computing device). In another example, the authorization to receive the data may be limited to a particular group of social-media accounts (e.g., a "friend list" associated with the first social-media account), and the social-media server might provide the data only to a group of computing devices authenticated as belonging to the group (perhaps including the second computing device).

In some examples, the second computing device (e.g., associated with the second social-media account) may cause display of an indication of the association between the first social-media account and the media playback system. The indication may take the form of a graphic, text, and/or particular colors, among other examples.

The indication may further indicate whether the media playback system (associated with the first social-media account) is currently playing back media content, and if so, may identify the media content being played back. In another example, the indication may further indicate that the media playback system is not currently playing back media content, but may identify the media content that was previously (or last) played back by the media playback system.

As indicated above, examples provided herein are directed to sharing data indicating an association of a media playback system (or a playback system account) and a social-media account and/or sharing data related to playback operations of a media playback system associated with a social-media account. The data may be shared with one or more computing devices associated with other social-media accounts.

In one aspect, a method is provided. The method involves receiving, by a social-media computing system from a first computing device, a first message indicating that a media playback system is associated with a first social-media account; and based on the received first message, sending, to a second computing device associated with a second social-media account, a second message indicating that the media playback system is associated with the first social-media account.

In another aspect, a social-media computing system is provided. The social-media computing system includes a processor and a non-transitory computer-readable medium storing instructions that when executed by the processor, cause the social-media computing system to perform functions. The functions include receiving, from a first computing device, a first message indicating that a media playback system is associated with a first social-media account; and based on the received first message, sending, to a second computing device associated with a second social-media account, a second message indicating that the media playback system is associated with the first social-media account.

In yet another aspect, a non-transitory computer-readable medium is provided. The non-transitory computer-readable medium stores instructions that when executed by a social-media computing system cause the social-media computing system to perform functions. The functions include receiving, from a first computing device, a first message indicating that a media playback system is associated with a first social-media account; and based on the received first message, sending, to a second computing device associated with a second social-media account, a second message indicating that the media playback system is associated with the first social-media account.

In yet another aspect, a method is provided. The method includes receiving from a social-media computing system, by a computing device associated with a first social-media account, a message indicating that a media playback system is associated with a second social-media account; and based on the received message, causing display, by the computing device, of an indication of the association between the media playback system and the second social-media account.

In yet another aspect, a computing device associated with a first social-media account is provided. The computing device includes a processor and a non-transitory computer-readable medium that stores instructions that when executed by the processor cause the computing device to perform functions. The functions include receiving from a social-media computing system, a message indicating that a media playback system is associated with a second social-media account; and based on the received message, causing display of an indication of the association between the media playback system and the second social-media account.

In yet another aspect, a non-transitory computer-readable medium is provided. The non-transitory computer-readable medium stores instructions that when executed by a computing device associated with a first social-media account cause the computing device to perform functions. The functions include receiving from a social-media computing system, a message indicating that a media playback system is associated with a second social-media account; and based on the received message, causing display of an indication of the association between the media playback system and the second social-media account.

It will be understood by one of ordinary skill in the art that this disclosure includes numerous other embodiments.

II. Example Network Configuration

FIG. 1 shows an example network configuration 100 in which one or more embodiments disclosed herein may be practiced or implemented. As shown, the network configuration 100 includes a wide area network ("WAN") 110 that communicatively couples a media system server 120, a social-media server 130, one or more media playback systems 140 and 142, and one or more computing devices 150, 152, and 154. It should be understood that the network configuration 100 may include more or fewer of the depicted network elements and/or may include various other network elements not shown in FIG. 1 (e.g. one or more media sources).

In examples, the WAN 110 may include the Internet and/or one or more cellular networks, among other networks. Although the WAN 110 is shown as one network, it should be understood that the WAN 110 may include multiple, distinct WANs that are themselves communicatively linked. The WAN 110 may facilitate transferring data between one or more of the various network elements shown in FIG. 1. In some examples, a given network element may communicate with another network element through yet another network element. For instance, the media playback systems 140 and 142 may communicate with the social-media server 130 through the media system server 120 and/or the computing devices 150-154 may communicate with the media system server 120 through the social-media server 130. Other examples are also possible.

In some examples, certain network elements may be communicatively coupled to other network elements via means other than the WAN 110. In particular, certain network elements may be communicatively coupled via a local area network (e.g., via WiFi), a personal area network (e.g., via Bluetooth), and/or other connections (e.g., via a wired connection). For example, the computing device 150 may communicate with the media playback system 140 via a local area network (e.g., WiFi or perhaps according to a proprietary protocol). The computing device 150 may do so while operating as part of the media playback system 140 (e.g., as a control device).

The media system server 120 may include a network interface, a processing unit, and data storage, all of which may be communicatively linked together by a system bus, network, or other connection mechanism. The network interface may facilitate data flow over the WAN 110 between the media system server 120 and other network elements.

The processing unit may include one or more general purpose processors and/or one or more special purpose processors and may be integrated in whole or in part with the network interface. The data storage may include a non-transitory computer-readable medium, such as optical, magnetic, or flash memory, and may be integrated in whole or in part with the processing unit. The data storage may also include program instructions that are executable by the processing unit to carry out various operations described herein.

Moreover, the media system server 120 may be configured to store and/or access various data related to media items and/or media playback systems. In examples, the media system server 120 may be configured to store and/or access media items that are playable by a media playback system. In such examples, the media system server 120 may be configured to provide to a given media playback system media items (e.g., audio, video, and/or audio-visual files) or links, pointers, or other network location identifiers that are operable to locate the media items. Additionally, the media system server 120 may be configured to store and/or access a cross-service linking database that facilitates identifying a media item from a first media source based on media item information from a second media source.

The media system server 120 may also be configured to provide one or more media applications to the media playback systems 140-142 and/or the computing devices 150-154. In some cases, a media application may be operable to allow a computing device to control one or more media playback systems. Additionally or alternatively, a media application may be operable to allow a media playback system to interface with the social-media server 130 and playback media items based on social-media data. Further still, a media application may be operable to provide functions similar to those provided by a social-media application, discussed in further detail below. Other example media applications are also possible.

In examples, the media system server 120 may be configured to store and/or access account information corresponding to a particular media playback system. Such information, which may be collectively referred herein as a "playback system account", may include system information (e.g., a household identifier (HHID) that is used to uniquely identify the particular media playback system, identifiers of the devices within the particular system, the software version currently installed on the particular media playback system, etc.) user information (e.g., name, date of birth, etc. of the user or users of the particular system), playback history information (e.g., media items previously played on the particular system and perhaps timestamps indicating when such media items were played), playback preference information (e.g., frequency at which a given media item is played, indications of media items that have been "liked" or "starred", etc.), and linked-account information (e.g., one or more social-media accounts that are linked to the particular media playback system). Other examples of information storable and accessible by the media system server 120 are also possible.

In some examples, a playback system account may also include information regarding the media services that provide media to the particular media playback system. For example, the playback system account may include one or more identifiers of media services that provide media to the particular media playback system. Such information may be used by the media system server 120, or perhaps the social-media server 130, to recommend media services that a user might be interested in. Other examples are also possible.

In practice, the media system server 120 may store some or all of the above-discussed information based on data received from media playback systems (e.g., the media playback systems 140 and 142), the social-media server 130, and/or the computing devices 150-154. In examples, such information may be provided to the media system server 120 when a media playback system is first setup, when a media playback system plays back media items, when a media playback system receives data indicating user feedback, and/or when a computing device runs a media application to control a media playback system, among other scenarios. In any event, the media system server 120 may be configured to provide an option to a user to "opt in" so that the aforementioned information is collected by the media system server 120.

The media system server 120 may be further configured to use the above-discussed information to determine playback behaviors of users of media playback systems, among other operations. Based on user playback behaviors, the media system server 120 may perform a number of operations that may add to the users' playback experience. For example, such information may be used to identify a trending artist and then recommend that trending artist to a user whose playback history indicates he/she listens to other artists similar to the trending artist. Other examples are certainly possible.

The social-media server 130 may include a network interface, a processing unit, and data storage, similar to those of the media system server 120 discussed above. The social-media server 130 may be configured to provide a social-media service to subscribers to the service. For example, the social-media server 130 may be configured to establish and/or maintain a social network. To this end, the social-media server 130 may be configured to host a social-media webpage accessible over the WAN 110 by subscribers utilizing any suitable computing device, such as the computing devices 150-154.

In examples, the social-media server 130 may be configured to store subscriber account information, which may be collectively referred herein as a "social-media account". Such information may include the name, gender, birthdate, email address, and/or residential address, among other information, for each subscriber. Moreover, the social-media server 130 may also be configured to link a given subscriber with a particular media playback system. For example, when a user first subscribes to the social-media service, the user may provide information, such as a HHID, of a media playback system used by the user, and the social-media server 130 may then store such information in the account of the subscriber.

In addition to subscriber account information, the social-media server 130 may also be configured to store respective subscriber profiles for each subscriber. Broadly speaking, a subscriber profile may include information regarding a subscriber's life, such as relationship status, photos, videos, career information, education information, hobbies/interests, locations visited (e.g., "check-in" locations), sports teams that the subscriber is a fan of, and/or movies, books, artists, TV shows, and the like that the subscriber previously experienced and perhaps enjoyed. Such information may be presented on a subscriber profile in a number of manners, such as through subscriber posts, status updates, blogs, and other uploads.

The social network provided by the social-media server 130 may be configured so that subscribers may readily share and exchange information, ideas, creations, and the like over a virtual community. The social-media service may provide to its subscribers, via a social-media webpage, respective social-media information that is determined to be relevant to a particular subscriber. Such information may be provided in several manners (e.g., as a "news feed", "timeline", or the like) and may be personalized to fit the preferences of a particular subscriber. In examples, this information may be continuously updated to reflect the most current information that may be relevant to a particular subscriber.

A given subscriber may have certain "friends" that he/she chooses to associate with. After someone is deemed a "friend" with a given subscriber, the given subscriber may then receive social information that is uploaded, tagged, posted, or otherwise provided by the "friend." For example, the given subscriber's news feed may show a photograph that a "friend" captured and subsequently posted to the social-media webpage. Moreover, a listing of a given subscriber's "friends" may also be provided and that listing may include various information in various forms reflecting a current "status" or the like for a given "friend." The given subscriber may at also be able to "de-friend" someone that was previously deemed a "friend."

In practice, the social-media server 130 may be configured to collect and analyze the information that is shared and exchanged over the social-media service. The social-media server 130 may be configured to use this collected information, as well as subscriber account information, to determine for a particular subscriber other subscribers that the particular subscriber might want to become "friends" with. In this way, the social-media server 130 may be configured to determine the preferences and/or tastes of its subscribers and recommend other subscribers with similar tastes.

Moreover, the social-media server 130 may be configured to provide one or more social-media applications that are operable to provide subscribers access to the social-media service in a manner different than through a web browser. Such an application may be installed on a computing device that is perhaps portable. In examples, a social-media application may further be operable to provide functions similar to those provided by a media application, as discussed above.

Furthermore, a social-media application, and/or perhaps a media application, installed on a computing device may be operable to determine what, if any, other applications are also installed on the computing device. An application that is operable in such a manner may facilitate linking a playback system account with a social-media account and vice versa. In examples, after a social-media application installed on a computing device is linked to a playback system account, the social-media application may be operable to affect playback of media at a media playback system identified by the playback system account.

In examples, the network configuration 100 may also include one or more media service provider servers communicatively coupled to the WAN 110. In general, a given media service provider server may correspond to a media service provider that provides streaming media, such as Internet radio and/or "on-demand" media, to the media playback systems 140-142 and/or the computing devices 150-154. A user may subscribe to such a service and register media devices (e.g., a media playback system and/or one or more computing devices) that may at times be used to access the media service. A media service provider server may include similar components as the servers discussed above.

Generally speaking, the media playback systems 140 and 142 may be any type of media playback system configured to receive and transmit data over a communication network and playback media items. In practice, each media playback system 140 and 142 may include one or more playback devices, as well as additional system devices (e.g., a controller device). An example media playback system is discussed in further detail below with reference to FIG. 2. It should be understood that the media playback system 140 and the media playback system 142 may be configured similarly or differently and/or may include similar or different devices.

In general, each computing device 150-154 may be any computing device configured to transfer data over a communication network. The computing devices 150-154 may each include at least one processor, memory, a graphical display, an input interface, and a network interface, among other components. In some instances, the graphical display and the input interface may be part of the same component (e.g., a touchscreen). The network interface may facilitate data flow between the computing device and another network element, for example, via the WAN 110. In some examples, one or more of the computing devices 150-154 may also include a camera configured to capture image and/or video data. Example computing devices include, but are not limited to, cellular phones, smartphones, PDAs, tablets, laptops, desktop computers, video game consoles, and smart TVs.

Moreover, the computing devices 150-154 may be configured to download, install, and operate an application, such as a media or social-media application. In examples, a given computing device may include a media application provided by the media system server 120 and a social-media application provided by the social-media server 130, while another computing device may include one or the other application but not both.

A computing device may be configured to run both applications at the same time or individually. In some examples, the computing devices 150-154 may provide to the media system server 120 and/or the social-media server 130 an indication of applications that are installed on a particular computing device. For instance, the computing device 150 may be configured to provide to the media system server 120 an indication that a social-media application is installed. Additionally or alternatively, the computing device 150 may be configured to provide to the social-media server 130 an indication that a media application is installed and/or active or otherwise currently running.

Furthermore, a computing device may be configured to provide social-media information and/or media playback information to the media system server 120 and/or the social-media server 130. Such information may then be used by the media system server 120 and/or the social-media server 130 to help perform some of the operations disclosed in further detail below.

III. Example Media Playback System

Figure 2:
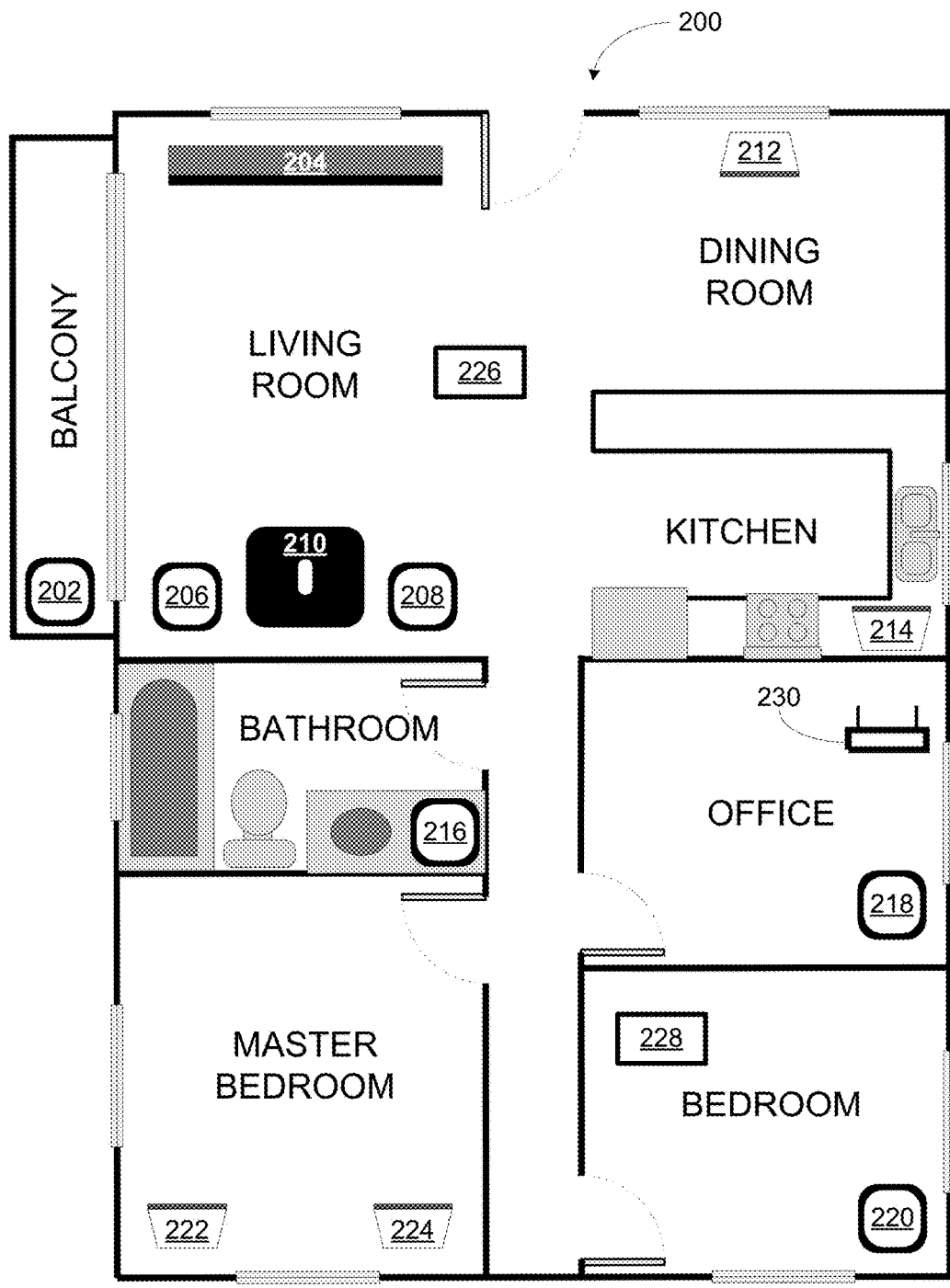
FIG. 2 shows an example media playback system configuration.

FIG. 2 shows an example configuration of a media playback system 200. The media playback system 200 as shown is associated with an example home environment having several rooms and spaces, such as for example, a master bedroom, an office, a dining room, and a living room. As shown in the example of FIG. 2, the media playback system 200 includes playback devices 202-224, control devices 226 and 228, and a wired or wireless network router 230.

Further discussions relating to the different components of the example media playback system 200 and how the different components may interact to provide a user with a media experience may be found in the following sections. While discussions herein may generally refer to the example media playback system 200, technologies described herein are not limited to applications within, among other things, the home environment as shown in FIG. 2. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 3:
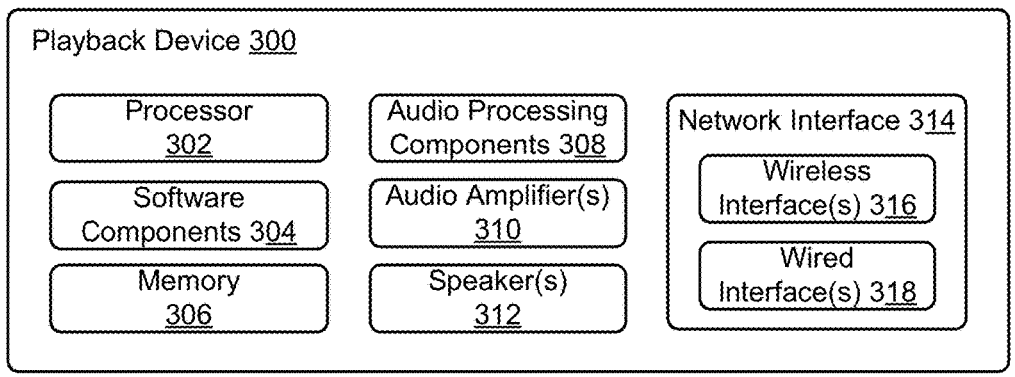
FIG. 3 shows a functional block diagram of an example playback device.

FIG. 3 shows a functional block diagram of an example playback device 300 that may be configured to be one or more of the playback devices 202-224 of the media playback system 200 of FIG. 2. The playback device 300 may include a processor 302, software components 304, memory 306, audio processing components 308, audio amplifier(s) 310, speaker(s) 312, and a network interface 314 including wireless interface(s) 316 and wired interface(s) 318. In one case, the playback device 300 may not include the speaker(s) 312, but rather a speaker interface for connecting the playback device 300 to external speakers. In another case, the playback device 300 may include neither the speaker(s) 312 nor the audio amplifier(s) 310, but rather an audio interface for connecting the playback device 300 to an external audio amplifier or audio-visual receiver.

In one example, the processor 302 may be a clock-driven computing component configured to process input data according to instructions stored in the memory 306. The memory 306 may be a tangible computer-readable medium configured to store instructions executable by the processor 302. For instance, the memory 306 may be data storage that can be loaded with one or more of the software components 304 executable by the processor 302 to achieve certain functions. In one example, the functions may involve the playback device 300 retrieving audio data from an audio source or another playback device. In another example, the functions may involve the playback device 300 sending audio data to another device or playback device on a network. In yet another example, the functions may involve pairing of the playback device 300 with one or more playback devices to create a multi-channel audio environment.

Certain functions may involve the playback device 300 synchronizing playback of audio content with one or more other playback devices. During synchronous playback, a listener will preferably not be able to perceive time-delay differences between playback of the audio content by the playback device 300 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 306 may further be configured to store data associated with the playback device 300, such as one or more zones and/or zone groups the playback device 300 is a part of, audio sources accessible by the playback device 300, or a playback queue that the playback device 300 (or some other playback device) may be associated with. The data may be stored as one or more state variables that are periodically updated and used to describe the state of the playback device 300. The memory 306 may also include the data associated with the state of the other devices of the media system, and shared from time to time among the devices so that one or more of the devices have the most recent data associated with the system. Other embodiments are also possible.

The audio processing components 308 may include one or more digital-to-analog converters (DAC), an audio preprocessing component, an audio enhancement component or a digital signal processor (DSP), and so on. In one embodiment, one or more of the audio processing components 308 may be a subcomponent of the processor 302. In one example, audio content may be processed and/or intentionally altered by the audio processing components 308 to produce audio signals. The produced audio signals may then be provided to the audio amplifier(s) 310 for amplification and playback through speaker(s) 312. Particularly, the audio amplifier(s) 310 may include devices configured to amplify audio signals to a level for driving one or more of the speakers 312. The speaker(s) 312 may include an individual transducer (e.g., a "driver") or a complete speaker system involving an enclosure with one or more drivers. A particular driver of the speaker(s) 312 may include, for example, a subwoofer (e.g., for low frequencies), a mid-range driver (e.g., for middle frequencies), and/or a tweeter (e.g., for high frequencies). In some cases, each transducer in the one or more speakers 312 may be driven by an individual corresponding audio amplifier of the audio amplifier(s) 310. In addition to producing analog signals for playback by the playback device 300, the audio processing components 308 may be configured to process audio content to be sent to one or more other playback devices for playback.

Audio content to be processed and/or played back by the playback device 300 may be received from an external source, such as via an audio line-in input connection (e.g., an auto-detecting 3.5 mm audio line-in connection) or the network interface 314.

The network interface 314 may be configured to facilitate a data flow between the playback device 300 and one or more other devices on a data network. As such, the playback device 300 may be configured to receive audio content over the data network from one or more other playback devices in communication with the playback device 300, network devices within a local area network, or audio content sources over a wide area network such as the Internet. In one example, the audio content and other signals transmitted and received by the playback device 300 may be transmitted in the form of digital packet data containing an Internet Protocol (IP)-based source address and IP-based destination addresses. In such a case, the network interface 314 may be configured to parse the digital packet data such that the data destined for the playback device 300 is properly received and processed by the playback device 300.

As shown, the network interface 314 may include wireless interface(s) 316 and wired interface(s) 318. The wireless interface(s) 316 may provide network interface functions for the playback device 300 to wirelessly communicate with other devices (e.g., other playback device(s), speaker(s), receiver(s), network device(s), control device(s), controller device(s) within a data network the playback device 300 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 318 may provide network interface functions for the playback device 300 to communicate over a wired connection with other devices in accordance with a communication protocol (e.g., IEEE 802.3). While the network interface 314 shown in FIG. 3 includes both wireless interface(s) 316 and wired interface(s) 318, the network interface 314 may in some embodiments include only wireless interface(s) or only wired interface(s).

In one example, the playback device 300 and one other playback device may be paired to play two separate audio components of audio content. For instance, playback device 300 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 300 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 300 is a playback device designed to render low frequency range audio content (i.e. a subwoofer), the playback device 300 may be consolidated with a playback device designed to render full frequency range audio content. In such a case, the full frequency range playback device, when consolidated with the low frequency playback device 300, may be configured to render only the mid and high frequency components of audio content, while the low frequency range playback device 300 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 3 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 200 of FIG. 2, the environment may have one or more playback zones, each with one or more playback devices. The media playback system 200 may be established with one or more playback zones, after which one or more zones may be added, or removed to arrive at the example configuration shown in FIG. 2. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 2, the balcony, dining room, kitchen, bathroom, office, and bedroom zones each have one playback device, while the living room and master bedroom zones each have multiple playback devices. In the living room zone, playback devices 204, 206, 208, and 210 may be configured to play audio content in synchrony as individual playback devices, as one or more bonded playback devices, as one or more consolidated playback devices, or any combination thereof. Similarly, in the case of the master bedroom, playback devices 222 and 224 may be configured to play audio content in synchrony as individual playback devices, as a bonded playback device, or as a consolidated playback device.

In one example, one or more playback zones in the environment of FIG. 2 may each be playing different audio content. For instance, the user may be grilling in the balcony zone and listening to hip hop music being played by the playback device 202 while another user may be preparing food in the kitchen zone and listening to classical music being played by the playback device 214. In another example, a playback zone may play the same audio content in synchrony with another playback zone. For instance, the user may be in the office zone where the playback device 218 is playing the same rock music that is being playing by playback device 202 in the balcony zone. In such a case, playback devices 202 and 218 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 200 may be dynamically modified, and in some embodiments, the media playback system 100 supports numerous configurations. For instance, if a user physically moves one or more playback devices to or from a zone, the media playback system 200 may be reconfigured to accommodate the change(s). For instance, if the user physically moves the playback device 202 from the balcony zone to the office zone, the office zone may now include both the playback device 218 and the playback device 202. The playback device 202 may be paired or grouped with the office zone and/or renamed if so desired via a control device such as the control devices 226 and 228. On the other hand, if the one or more playback devices are moved to a particular area in the home environment that is not already a playback zone, a new playback zone may be created for the particular area.

Further, different playback zones of the media playback system 200 may be dynamically combined into zone groups or split up into individual playback zones. For instance, the dining room zone and the kitchen zone 214 may be combined into a zone group for a dinner party such that playback devices 212 and 214 may render audio content in synchrony. On the other hand, the living room zone may be split into a television zone including playback device 204, and a listening zone including playback devices 206, 208, and 210, if the user wishes to listen to music in the living room space while another user wishes to watch television.

c. Example Control Devices

Figure 4:
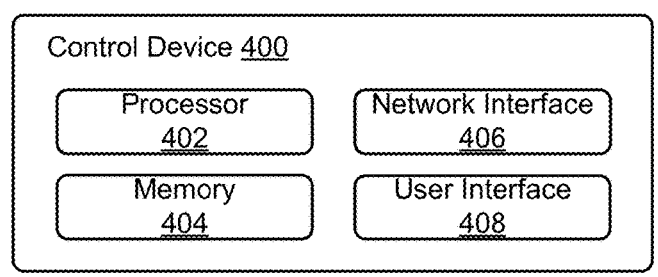
FIG. 4 shows a functional block diagram of an example control device.

FIG. 4 shows a functional block diagram of an example control device 400 that may be configured to be one or both of the control devices 226 and 228 of the media playback system 200. As shown, the control device 400 may include a processor 402, memory 404, a network interface 406, and a user interface 408. In one example, the control device 400 may be a dedicated controller for the media playback system 200.

In another example, the control device 400 may be a network device on which media application software is installed, such as an iPhone™, iPad™ or any other smart phone, tablet or network device (e.g., a networked computer such as a PC or Mac™). In examples, the media application may take the form of a media playback system controller application operable to control a media playback system. In yet another example, the media application may be operable to cause the control device 400 to obtain media (e.g., from a given media service provider associated with the media application) independent from a media playback system and may also be operable as a control device of a media playback system.

The processor 402 may be configured to perform functions relevant to facilitating user access, control, and configuration of the media playback system 200. The memory 404 may be configured to store instructions executable by the processor 402 to perform those functions. The memory 404 may also be configured to store the media playback system controller application software and other data associated with the media playback system 200 and the user.

In one example, the network interface 406 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 406 may provide a means for the control device 400 to communicate with other devices in the media playback system 200. In one example, data and information (e.g., such as a state variable) may be communicated between control device 400 and other devices via the network interface 406. For instance, playback zone and zone group configurations in the media playback system 200 may be received by the control device 400 from a playback device or another network device, or transmitted by the control device 400 to another playback device or network device via the network interface 406. In some cases, the other network device may be another control device.

Playback device control commands such as volume control and audio playback control may also be communicated from the control device 400 to a playback device via the network interface 406. As suggested above, changes to configurations of the media playback system 200 may also be performed by a user using the control device 400. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 400 may sometimes be referred to as a controller, whether the control device 400 is a dedicated controller or a network device on which media playback system controller application software is installed.

Figure 5:
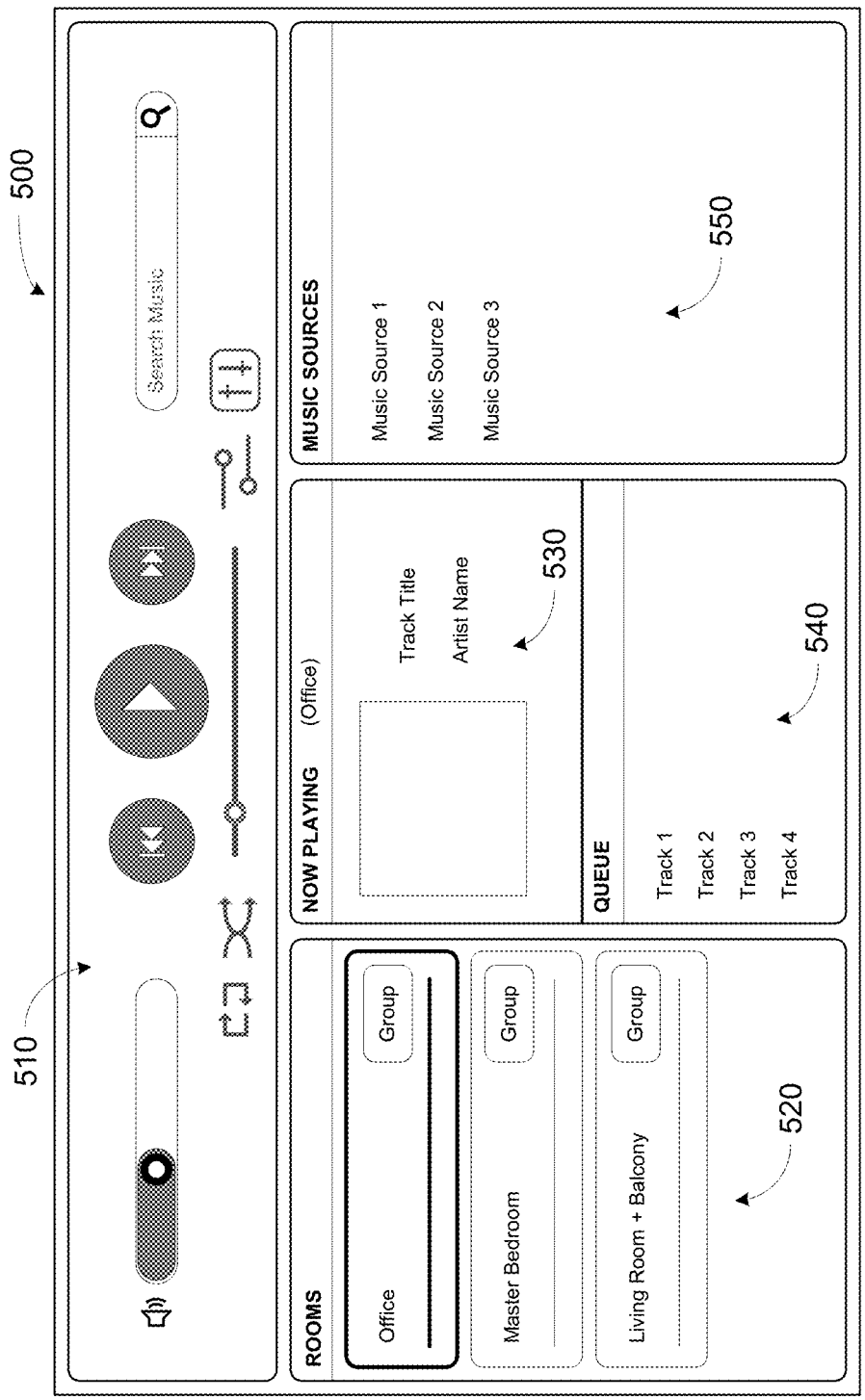
FIG. 5 shows an example controller interface.

The user interface 408 of the control device 400 may be configured to facilitate user access and control of the media playback system 200, by providing a controller interface such as the controller interface 500 shown in FIG. 5. The controller interface 500 includes a playback control region 510, a playback zone region 520, a playback status region 530, a playback queue region 540, and an audio content sources region 550. The user interface 500 as shown is just one example of a user interface that may be provided on a network device such as the control device 400 of FIG. 4 (and/or the control devices 226 and 228 of FIG. 2) and accessed by users to control a media playback system such as the media playback system 200. Other user interfaces of varying formats, styles, and interactive sequences may alternatively be implemented on one or more network devices to provide comparable control access to a media playback system.

The playback control region 510 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 510 may also include selectable icons to modify equalization settings, and playback volume, among other possibilities.

The playback zone region 520 may include representations of playback zones within the media playback system 200. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 500 are also possible. The representations of playback zones in the playback zone region 520 may be dynamically updated as playback zone or zone group configurations are modified.

The playback status region 530 may include graphical representations of audio content that is presently being played, previously played, or scheduled to play next in the selected playback zone or zone group. The selected playback zone or zone group may be visually distinguished on the user interface, such as within the playback zone region 520 and/or the playback status region 530. The graphical representations may include track title, artist name, album name, album year, track length, and other relevant information that may be useful for the user to know when controlling the media playback system via the user interface 500.

The playback queue region 540 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 500 of FIG. 5, the graphical representations of audio content in the playback queue region 540 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 550 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 200 of FIG. 2, local music libraries on one or more network devices (such as a control device, a network-enabled personal computer, or a networked-attached storage (NAS), for example), streaming audio services providing audio content via the Internet (e.g., the media service servers 135-145), or audio sources connected to the media playback system via a line-in input connection on a playback device or network devise, among other possibilities.

In some embodiments, audio content sources may be regularly added or removed from a media playback system such as the media playback system 200 of FIG. 2. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

IV. Methods and Systems for Indicating an Association Between a Social-Media Account and a Media Playback System As discussed above, in some examples, a social-media server may facilitate the exchange of data between computing devices associated with respective social-media accounts. The exchanged data may be used to associate a media playback system (or a playback system account corresponding to the media playback system) with a social-media account, and/or to provide an indication of playback operations of a media playback system corresponding to the playback system account.

Methods and systems disclosed herein may be implemented within an environment that includes one or more of the example network configuration 100 of FIG. 1, the example media playback system 200 of FIG. 2, the playback device 300 of FIG. 3, the control device 400 of FIG. 4, and the example controller interface 500 of FIG. 5.

Figure 6:
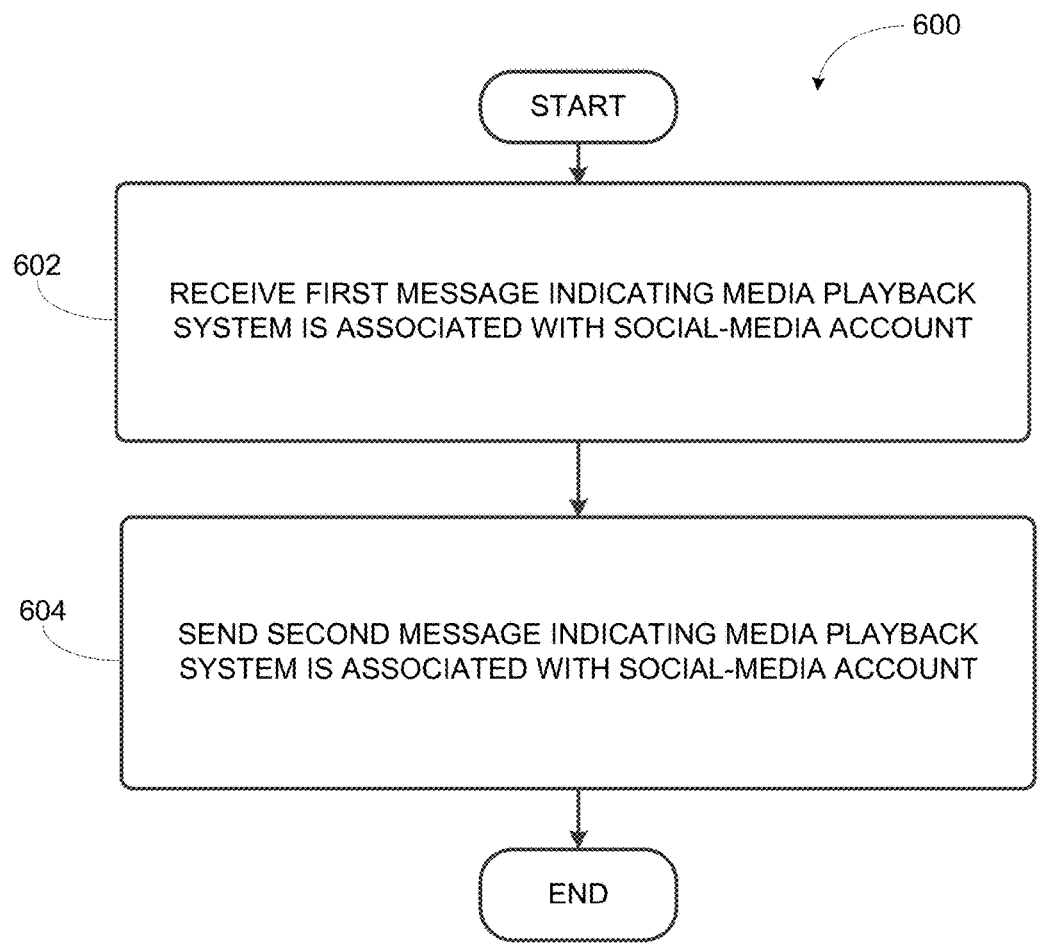
FIG. 6 shows a flow diagram of an example method.
Figure 7:
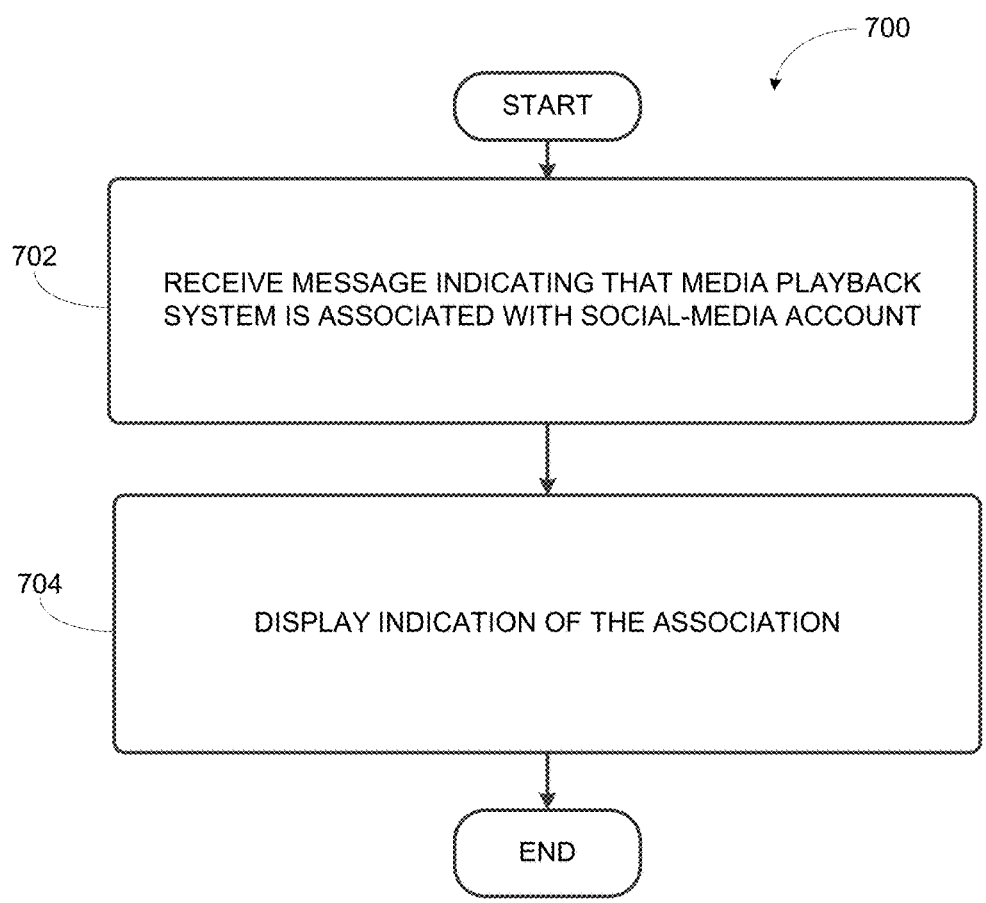
FIG. 7 shows a flow diagram of an example method.

For methods 600 and 700 of FIGS. 6 and 7, and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the methods 600 and 700 and other processes and methods disclosed herein, each block in FIGS. 6 and 7 may represent circuitry that is wired to perform the specific logical functions in the process.

Furthermore, although the blocks are illustrated in sequential order, these blocks may also be performed in parallel, and/or in a different order than those described herein. Also, the various blocks may be combined into fewer blocks, divided into additional blocks, and/or removed based upon the desired implementation.

Figure 8:
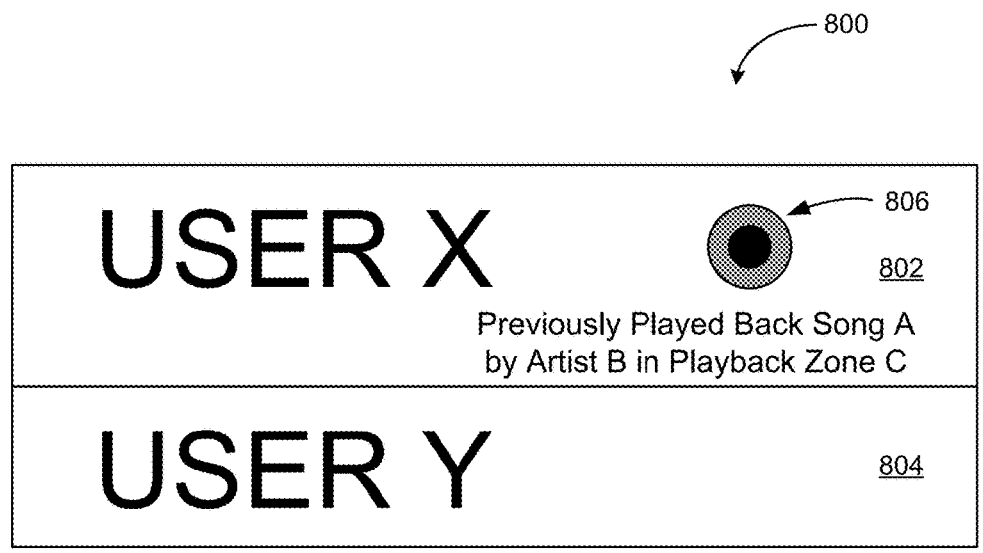
FIG. 8 shows an example display.
Figure 9:
FIG. 9 shows an example display.

For clarity, the methods may be described herein with reference to FIGS. 8 and 9. It should be understood, however, that this is for purposes of example and explanation only and that the operations of the methods should not be limited by these figures.

Referring now to FIG. 6, at block 602 the method 600 involves receiving, by a social-media computing system from a first computing device, a first message indicating that a media playback system is associated with a first social-media account. In some cases, the media playback system can be accessed using one or more playback system accounts. In some examples, the first message may also indicate that a playback system account corresponding to the media playback system is associated with the first social-media account. In some examples, the media playback system may include at least two playback devices configured to play back media content in synchrony.

In some examples, block 602 may be performed in response to, or otherwise after, various operations. For instance, the social-media computing system (e.g., social-media server 130) may send a query message to the media system server 120 and/or media playback devices 140 or 142. The query message may represent a request for information regarding whether any media playback devices associated with social-media accounts corresponding to the social-media server 130 are playing back media content. The social-media server 130 may forward such query messages that originate from computing devices (e.g., computing device 150-154) as well. In another example, the computing device 152 may be communicatively coupled to the media playback system 140 and may send the query message to the media playback system 140 directly. The computing device 152 may also execute applications respectively corresponding to the social-media server 130 (e.g., a social-media application) and the media system server 120 (e.g., a media playback application). The social-media application may query the media playback application for such information. Other examples are possible.

As an example, the social-media computing system may include the social-media server 130 of FIG. 1. In various examples, the social-media computing system may include a single computing device or a collection of networked computing devices configured to perform the functionality of the social-media server 130 described above with regard to FIG. 1.

The first computing device may take the form of any of the computing devices 150-154 discussed above. In one example, the first computing device is a control device included as part of the media playback system 140. In this example, the first computing device may be configured to control the media playback system 140. The media playback system 140 may be the media playback system associated with the first social-media account.

Generally, the first computing device may include any computing device that is (i) authenticated by the media system server 120 (or a media playback system) as being associated with the media playback system and (ii) authenticated with the social-media server 130 as being associated with the first social-media account. For example, the first computing device may include any of the computing devices 150-154, or a computing device (e.g., a control device) of the media playback systems 140 or 142. Example computing devices include, but are not limited to, cellular phones, smartphones, PDAs, tablets, laptops, desktop computers, video game consoles, and smart TVs.

The first social-media account may include an account of a social-media service provider that operates the social-media server 130. For example the first social-media account may be associated with a given subscriber profile of the social-media service as described above with regard to FIG. 1. The playback system account may include an account of a provider that operates the media system server 120 as described above in regard to FIG. 1. The playback system account may correspond to the media playback system (e.g., the media playback system 140).

The first message sent by the first computing device to the social-media server 130 may include any data that indicates the association of the media playback system (or the playback system account) with the first social-media account. For example, the first message may include sign-in credentials corresponding to the first social-media account and/or an indication of the media playback system (e.g., HHID) that is associated with the first social-media account.

At block 604, the method 600 involves, based on the received first message, sending, from the social-media computing system to a second computing device associated with a second social-media account, a second message indicating that the media playback system is associated with the first social-media account. (The second message may also indicate that the playback system account is associated with the first social-media account.)

For example, the social-media server 130 may send the second message to any of the computing devices 150-154. The second computing device may be authenticated by the social-media server 130 as being associated with the second social-media account (e.g., by the social-media server 130 receiving sign-in credentials corresponding to the second social-media account). The second message may include any data that indicates that the media playback system is associated with the first social-media account (or that the playback system account is associated with the first social-media account). For example, the second message may include a media playback system identifier (e.g., HHID) and/or data identifying the first social-media account (e.g., a username associated with the first social-media account). In one example, the second computing device may cause display of an indication (perhaps within a display of the second computing device) of the association between the media playback system and the first social-media account (e.g. indications 806 and 906 of FIGS. 8 and 9, respectively). The second computing device may also cause display of an indication of an association between the playback system account and the first social-media account.

Additional operations may be carried out with or in addition to the method 600. It should be understood that the below discussed operations are not necessary to perform the method 600.

Prior to sending the second message, the social-media server 130 may determine whether the second social-media account is associated with a media playback system. For example, the social-media server 130 may search a database for data indicating an association between the second social-media account and a media playback system. If the second social-media account is association with a media playback system, the social-media server 130 may send the second message to the second computing device. In some examples, if the social-media server 130 determines that the second social-media account is not associated with a media playback system, the social-media server 130 may refrain from sending the second message.

Prior to sending the second message, the social-media server 130 may receive a third message (e.g., from the media system server 120, the media playback system 140, or the first computing device). The third message need not be received from the same computing device from which the first message was received. The third message may include information that is later included in the second message sent to the second computing device.

For example, the third message may indicate that the media playback system (e.g., the media playback system 140) is playing back media content. In some examples, the third message may also identify the media content that the media playback system is playing back. For example, the third message may indicate that the media playback system is playing back "Song A" by "Artist B." Accordingly, in some examples the second message (sent by the social-media server 130 to the second computing device) may indicate that the media playback system is playing back "Song A" by "Artist B." This information may be indicated by an indicator displayed by the second computing device (e.g., indicator 906 of FIG. 9).

Alternatively, the third message may indicate that the media playback system is not playing back media content. In this example, the third message may also identify media content that the media playback system was previously playing back, such as "Song A" by "Artist B." Accordingly, in some examples the second message (sent by the social-media server 130 to the second computing device) may indicate that the media playback system associated with the first social-media account is not playing back media content, but may identify media content that the media playback system was previously playing back. For example, the second message may indicate that the media playback system was playing back "Song A" by "Artist B" at a previous time (e.g., the second message may indicate that "Song A" by "Artist B" was the last media content played back by the media playback system). This information may be indicated by an indicator displayed by the second computing device (e.g., indicator 806 of FIG. 8).

Further operations may include, prior to receiving the third message, sending a request for a message indicating whether the media playback system is playing back media content; and after sending the request, receiving the third message. For example, the social-media server 130 may send the request to a control device of the media playback system 140, to the media system server 120, or any of the computing devices 150-154. The social-media server 130 may then receive the third message from whichever computing device (e.g., the media system server 120, computing devices 150-154, or a control device of the media playback system 140) the request was sent to.

Referring to FIG. 7, block 702 of the method 700 involves receiving from a social-media server, by a computing device associated with a first social-media account, a message indicating that a media playback system is associated with a second social-media account. (The message may also indicate that a playback system account corresponding to the media playback system is associated with the second social-media account.)

One or more operations may be performed before the computing device receives the message. One such operation may involve the computing device registering or otherwise associating with a social-media account. Referring to FIG. 1 as an example, the process of associating the computing device with the first social-media account may include the social-media server 130 authenticating the computing device (e.g., the computing device 150) by receiving, from the computing device, sign-in credentials corresponding to the first social-media account.

The computing device 150 may receive the message from the social-media server 130. The message may include any data indicating the association between (i) the media playback system (e.g., the media playback system 140) (ii) and the second social-media account. For example, the social-media server 130 may receive data from a (second) computing device (e.g., the computing device 152 or a control device of the media playback system 140) indicating the association between the media playback system and the second social-media account. The social-media server 130 may authenticate the second computing device by receiving, from the second computing device, sign-in credentials corresponding to the second social-media account and/or receiving an identifier (e.g., HHID) of the media playback system.

In various examples, the message received by the computing device may also indicate that the media playback system is playing back media content and/or may identify the media content that the media playback system is playing back. Alternatively, the received message may indicate that the media playback system is not playing back media content and/or may identify media content that the media playback system was playing back at a previous time. For example, the received message may indicate media content that the media playback system last played back.

At block 704, the method 700 involves, based on the received message, causing display, by the computing device, of an indication of the association between the media playback system and the second social-media account. (The displayed indication may also indicate an association between the playback system account and the second social-media account.) The displayed indication may be displayed by a display of the computing device associated with the first social-media account. In examples, the displayed indication may take the form of a graphic (e.g., a particular icon), text, and/or particular colors or other characteristics that are indicative of a social-media account being associated with a media playback system. That is, the displayed indication may help identify to a user "friends" that have a media playback system that is linked with their respective social-media account.

Referring to FIG. 8 as an example, a display of the computing device may resemble display 800 which reads "USER X" at a first row 802 and "USER Y" at a second row

804. The displayed text "USER X" and "USER Y" may each represent social-media accounts that are included in a "friend list" corresponding to the first social-media account. Based on receiving the message, the computing device may display indication 806 within the first row 802. The indication 806 may indicate that the playback system account and/or a corresponding media playback system are associated with the second social-media account (e.g., "USER X").

In some examples, the received message may indicate that the media playback system is not playing back media content and/or identify media content that was previously played back by the media playback system. The indication 806 may be "greyed out" or otherwise indicate that the media playback system is not currently playing back media content. For example, the indication 806 may also include displayed text, such as "Previously Played Back Song A by Artist B." As a point of comparison, the second row 804 of the display 800 might not include an indication of an association between a social-media account "USER Y" and a media playback system. In other examples, the displayed text shown in FIG. 9 may not be visible until a user "hovers over" (e.g., with a cursor or one of the user's fingers) the indication 906.

In another example, the received message may indicate that the media playback system is playing back media content and/or identify the media content being played back by the media playback system. Referring to FIG. 9 as an example, the indication 906 of the display 900 may indicate that the media playback system is playing back media content, perhaps via a dashed line encircling the indication 906 or via other imagery or animation that distinguishes the indication 906 from the indication 806 of FIG. 8 (e.g., displaying indication 906 so that indication 906 is not "greyed out"). The indication 906 may further identify the media content that the media playback system is playing back. For example, the indication 906 may include text reading "Playing Back Song A by Artist B," and in some examples, the text may be visible when a user hovers over the indication 1006.

Additional operations may be carried out with or in addition to the method 700. It should be understood that the below discussed operations are not necessary to perform the method 700.

An additional operation may include detecting an input representing a selection (or hover over) of the displayed indication; and based on detecting the input (or hover over), causing display of an indication of information related to at least one playback operation of the media playback system.

In one example, the received message further indicates a source of a media item that the media playback system plays back, and the computing device may cause display of an indication of the source of the media item that the media playback system plays back. For example, displayed text may accompany the indication 906 of FIG. 9 (not shown). The displayed text may indicate that the source of the media item is a particular media service provider, a file stored within a local area network that includes the media playback system, and/or a hardwired "line-in" source that outputs an audio signal to be received by an input port of the media playback system for playback, as the case may be.

In another example, the received message further indicates a playback zone of the media playback system where the media item is being played back. Accordingly, displayed text accompanying indicator 906 of FIG. 9 may include example phrases such as "Playing Back Song A by Artist B in Playback Zone C" depending on which playback zone the media item is being played back at.

For example, the computing device may receive input indicating intended movement of a pointer 908 (e.g., a mouse pointer). The input may cause the pointer 908 to be displayed over the indication 906, in a manner that indicates a selection of the indication 906. In response to the detected input, the computing device may cause display of the text "Playing Back Song A by Artist B."

In another example, detecting the input or hover over may cause a pop-up menu to be displayed. The pop-up menu may include options for additional information to be displayed. For example, one option may be for the computing device to cause display of a list of the last ten items of media content played back by the media playback system. Another option may include the computing device playing back one or more of the items of media content from the list. The computing device may then receive additional input indicating a command to perform such operations.

In yet another example, after the computing device detects an input or hover over at the displayed indication, the computing device may cause display of an option to play back at a (perhaps second) media playback system associated with the computing device, the media content that is being played by the (first) media playback system. For example, referring back to FIG. 9, the computing device may cause display of an option to cause a (second) media playback system associated with the computing device to play back "Song A by Artist B." In some examples, the (second) media playback system may play back that song in synchrony with the media playback system associated with "User X." In other examples, the (second) media playback system may play back that song independently. Other examples are also possible.

It will be understood by one of ordinary skill in the art that this disclosure includes numerous other embodiments. While some examples described herein may refer to functions performed by given actors such as "users," "subscribers," and/or other entities, it should be understood that this is for purposes of explanation only. The claims should not be interpreted to require action by any such example actor unless explicitly required by the language of the claims themselves.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

In one aspect, a method is provided. The method involves receiving, by a social-media computing system from a first computing device, a first message indicating that a media playback system is associated with a first social-media account; and based on the received first message, sending, to a second computing device associated with a second social-media account, a second message indicating that the media playback system is associated with the first social-media account.

In another aspect, a social-media computing system is provided. The social-media computing system includes a processor and a non-transitory computer-readable medium storing instructions that when executed by the processor, cause the social-media computing system to perform functions. The functions include receiving, from a first computing device, a first message indicating that a media playback system is associated with a first social-media account; and based on the received first message, sending, to a second computing device associated with a second social-media account, a second message indicating that the media playback system is associated with the first social-media account.

In yet another aspect, a non-transitory computer-readable medium is provided. The non-transitory computer-readable medium stores instructions that when executed by a social-media computing system cause the social-media computing system to perform functions. The functions include receiving, from a first computing device, a first message indicating that a media playback system is associated with a first social-media account; and based on the received first message, sending, to a second computing device associated with a second social-media account, a second message indicating that the media playback system is associated with the first social-media account.

In yet another aspect, a method is provided. The method includes receiving from a social-media computing system, by a computing device associated with a first social-media account, a message indicating that a media playback system is associated with a second social-media account; and based on the received message, causing display, by the computing device, of an indication of the association between the media playback system and the second social-media account.

In yet another aspect, a computing device associated with a first social-media account is provided. The computing device includes a processor and a non-transitory computer-readable medium that stores instructions that when executed by the processor cause the computing device to perform functions. The functions include receiving from a social-media computing system, a message indicating that a media playback system is associated with a second social-media account; and based on the received message, causing display of an indication of the association between the media playback system and the second social-media account.

In yet another aspect, a non-transitory computer-readable medium is provided. The non-transitory computer-readable medium stores instructions that when executed by a computing device associated with a first social-media account cause the computing device to perform functions. The functions include receiving from a social-media computing system, a message indicating that a media playback system is associated with a second social-media account; and based on the received message, causing display of an indication of the association between the media playback system and the second social-media account.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A social-media computing system comprising:
   a network interface;
   a processor; and
   a non-transitory computer-readable medium storing instructions that when executed by the processor cause the social-media computing system to perform functions comprising:
      receiving, from a first computing device via the network interface, a first message indicating that a media playback system corresponds to a first social-media account, wherein the media playback system comprises a playback device configured to play media content in a zone, and wherein the first computing device is distinct from the playback device;
      determining, via the social-media computing system, that a second social-media account is subscribed to the media playback system corresponding to the first social-media account;
      receiving, from the media playback system, a second message indicating that the media playback system corresponding to the first social-media account is playing particular media content in the zone; and
      based on (i) determining that the second social-media account is subscribed to the media playback system corresponding to the first social-media account, and (ii) the received second message indicating that the media playback system corresponding to the first social-media account is playing the particular media content in the zone, causing a second computing device corresponding to the second social-media account to display an indication that the media playback system corresponding to the first social-media account is playing the particular media content in the zone, wherein causing the second computing device to display the indication comprises sending, to the second computing device, a third message indicating that the media playback system is playing the particular media content in the zone.

2. The social-media computing system of claim 1, wherein the media playback system comprises the first computing device.

3. The social-media computing system of claim 1, wherein the third message and the second message both identify the particular media content.

4. The social-media computing system of claim 1, further comprising:
  prior to receiving the second message, sending a request for a message indicating whether the media playback system is playing back media content; and
  after sending the request, receiving the second message.

5. The social-media computing system of claim 4, wherein sending the request comprises sending the request to a media system computing system and receiving the second message comprises receiving the second message from the media system computing system.

6. The social-media computing system of claim 4, wherein sending the request comprises sending the request to the media playback system and receiving the second message comprises receiving the second message from the media playback system.

7. The social-media computing system of claim 1, further comprising receiving a fourth message indicating that the media playback system corresponding to the first social-media account is not playing back media content.

8. A computing device associated with a first-social media account, the computing device comprising:
  a processor; and
  a non-transitory computer-readable medium storing instructions that when executed by the processor cause the computing device to perform functions comprising:
    receiving, via a computing device corresponding to a first social-media account, a message indicating that a playback device of a media playback system corresponding to a second social-media account is playing particular media content in a zone, wherein the first social-media account is subscribed to the media playback system corresponding to the second social-media account;
    detecting, via the computing device, an input representing a selection of an indication that corresponds to the media playback system; and
    based on (i) the received message indicating that the playback device of the media playback system is playing the particular media content in the zone, and (ii) the detected input representing the selection of the indication that corresponds to the media playback system, causing display of an indication representing that the media playback system is playing the particular media content in the zone.

9. The computing device of claim 8, wherein the playback device is a first playback device, and wherein the media playback system comprises a second playback device configured to play back media content in synchrony with the first playback device.

10. The computing device of claim 8, wherein the received message further indicates a source of the particular media content that is being played by the playback device of the media playback system corresponding to the second social-media account, and wherein causing display of the indication representing that the media playback system is playing the particular media content in the zone comprises causing display of the source of the particular media content.

11. The computing device of claim 8, wherein the received message identifies the particular media content that the playback device of the media playback system is playing back, and wherein causing display of the indication representing that the media playback system is playing the particular media content in the zone comprises identifying the particular media content.

12. The computing device of claim 8, the functions further comprising:
  receiving a second message indicating that a second playback device of the media playback system is not playing back media content; and
  causing display of an indication representing that the second playback device of the media playback system is not playing back media content.

13. The computing device of claim 8, the functions further comprising:
  receiving a second message indicating media content that was previously played back by the media playback system; and
  causing display of an indication representing the media content that was previously played back by the media playback system.

14. A method comprising:
  receiving, via a computing device corresponding to a first social-media account, a message indicating that a playback device of a media playback system corresponding to a second social-media account is playing particular media content in a zone, wherein the first social-media account is subscribed to the media playback system corresponding to the second social-media account;
  detecting, via the computing device, an input representing a selection of an indication that corresponds to the media playback system; and
  based on (i) the received message indicating that the playback device of the media playback system is playing the particular media content in the zone, and (ii) the detected input representing the selection of the indication that corresponds to the media playback system, causing display of an indication representing that the media playback system is playing the particular media content in the zone.

15. The method of claim 14, further comprising causing display of an indication of an association between the first social-media account and the second social-media account.

16. The method of claim 14, further comprising:
  receiving a second message indicating that a second playback device of the media playback system is not playing back media content; and
  causing display of a second indication representing that the second playback device of the media playback system is not playing back media content.

17. The social-media computing system of claim 7, wherein receiving the fourth message indicating that the media playback system corresponding to the first social-media account is not playing back media content comprises receiving an indication that the media playback system corresponding to the first social-media account is not playing back media content in the zone.

18. The social-media computing system of claim 1, further comprising:
  receiving a fourth message indicating that the media playback system previously played a second media content in the zone; and
  based on (i) determining that the second social-media account is subscribed to the media playback system corresponding to the first social-media account, and (ii) the received fourth message indicating that the media playback system previously played the second media content in the zone, causing a second computing device corresponding to the second social-media account to display an indication that the media playback system corresponding to the first social-media account previously played the second media content in the zone.

19. The computing device of claim 12, wherein receiving the second message indicating that the second playback device of the media playback system is not playing back media content comprises receiving an indication that the second playback device of the media playback system is not playing back media content in the zone.

20. The computing device of claim 12, wherein causing display of the indication representing that the second playback device of the media playback system is not playing back media content comprises causing display of an indication that the second playback device of the media playback system is not playing back media content in the zone.

* * * * *